United States Patent [19]

Sadamatsu

[11] Patent Number: 5,299,008
[45] Date of Patent: Mar. 29, 1994

[54] VIDEO TONE CORRECTION CONTROL CIRCUIT

[75] Inventor: Hideaki Sadamatsu, Hirakata, Japan

[73] Assignee: Matsushita Electric Industrial Co., Ltd., Osaka, Japan

[21] Appl. No.: 835,489

[22] Filed: Feb. 14, 1992

[30] Foreign Application Priority Data

Feb. 28, 1991 [JP] Japan .................................. 3-033989

[51] Int. Cl.$^5$ .................................................. H04N 5/57
[52] U.S. Cl. ..................................... 348/707; 330/261; 348/687
[58] Field of Search ............... 358/184, 168, 169, 164, 358/166; 330/254, 260, 261; 340/793; H04N 5/57

[56] References Cited

U.S. PATENT DOCUMENTS

| 3,996,608 | 12/1976 | Harwood | 358/28 |
| 4,422,095 | 12/1983 | Hosoya | 358/168 |
| 5,057,787 | 10/1991 | Arai et al. | 330/254 |

FOREIGN PATENT DOCUMENTS

| 54-80754 | 6/1979 | Japan | H04N 5/57 |
| 64-80177 | 3/1989 | Japan | H04N 5/57 |
| 437263 | 2/1992 | Japan | |

Primary Examiner—Victor R. Kostak
Assistant Examiner—Jeffrey S. Murrell
Attorney, Agent, or Firm—Stevens, Davis, Miller & Mosher

[57] ABSTRACT

A tone correction circuit for a luminance signal which can provide several shapes of correction characteristics. The tone correction circuit comprises a circuit in which the current increases at a first specified voltage or higher and decreases at a second specified voltage or higher so that the current is outputted in a specified range and also provided is a circuit which serves to increase the current at the second specified voltage or higher. Thus, without changing the output voltage at the midpoint, the correction amounts at the minimum point and midpoint, the shifting amount of the midpoint, the correction amounts from to the maximum point and the correction amount at the maximum point, can be controlled so that an optimum output waveform can be obtained in accordance with a scene, and particularly, fuzzy control for the scene can be efficiently made.

47 Claims, 10 Drawing Sheets

INPUT SIGNAL ($V_S - V_P$)

FIG. 2 B

INPUT SIGNAL

VIDEO TONE CORRECTION CONTROL CIRCUIT

BACKGROUND OF THE INVENTION

1. Field of the Invention

The present invention relates to a tone correction circuit, and more particularly to a tone correction circuit which can provide an optimum tone for a scene for e.g. fuzzy control.

2. Description of the Related Art

One example of previously known circuits for correcting the tone of a luminance signal is disclosed in JP-A-143158.

Figure 9:
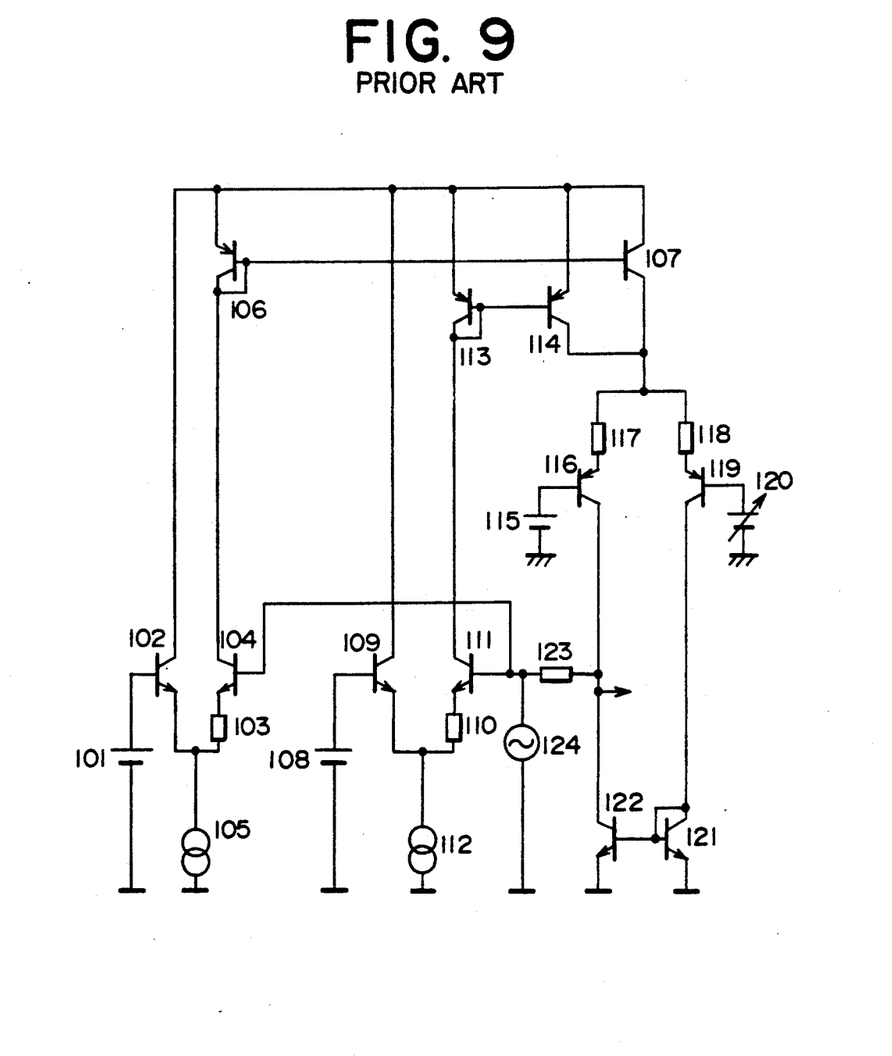
FIG. 9 is a circuit diagram of the circuit for correcting the tone of a luminance signal according to the prior art.
Figure 10:
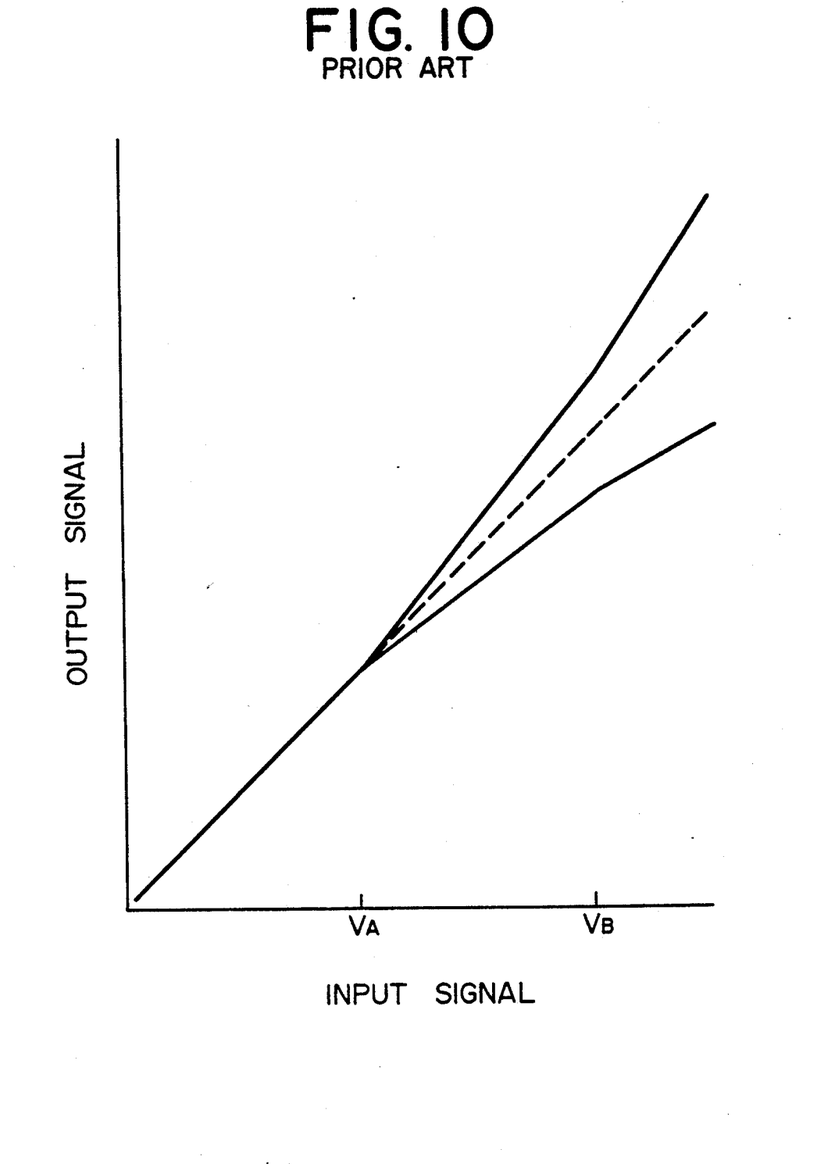
FIG. 10 is a graph showing the characteristic in the circuit in FIG. 9.

FIG. 9 is a circuit diagram of such a conventional circuit for correcting the tone of a luminance signal. FIG. 10 is a graph showing the characteristic of this circuit. In FIG. 9, 101 denotes a constant voltage VA; 108 denotes a constant voltage VB; 124 denotes a luminance signal; 115 denotes a constant voltage; 120 denotes a control voltage; 102, 104, 109, 11, 121, 122 denote NPN transistors, respectively; 106, 107, 113, 114, 116 and 119 denote PNP transistors, respectively; and 103, 110, 117, 118 and 123 denote resistors, respectively.

In the operation of the circuit thus constructed, when the luminance signal voltage exceeds the constant voltage VA, the current which is obtained by dividing the difference between the luminance signal voltage and VA by the resistance of the resistor 103 flows into the NPN transistor 104. Also, when the luminance voltage exceeds the constant voltage VB, the current which is obtained by dividing the difference between the luminance signal and VB by the resistance of the resistor 110 flows into the NPN transistor 111. The currents flowing through the NPN transistors 104 and 111 flow into a differential amplifier composed of the resistor 117, the PNP transistor 116, the resistor 118 and the PNP transistor 119 through current mirrors composed of the PNP transistors 116 and 119, and the PNP transistors 113 and 114, respectively. These currents flow into or out from the resistor 123 with the aid of the control voltage 120 and a current mirror composed of the NPN transistors 121 and 122. Addition of the voltage across the resistor 123 to the luminance signal can provide a linear characteristic bent upward or downward when compared with the characteristic having the ratio of an input to an output of 1:1.

However, the above circuit configuration has the following defect. The linear characteristic bent upward or downward from the line of ratio of 1:1 does not return to the original straight line. If it is desired that different gradients are given to the signal components with lower luminance (VA or lower) and higher luminance (VB or higher), a desired input/output characteristic cannot be obtained. Therefore, optimum control cannot be made for the signals differentially distributed over a high luminance range and a low luminance range.

SUMMARY OF THE INVENTION

An object of the present invention is to provide a circuit, for correcting the tone of a luminance signal which can make optimally control the signals differentially distributed over a high luminance range and a low luminance range.

In order to attain the above object, the tone correction circuit for a luminance signal according to the present invention is provided with a circuit in which the current increases at a first specified voltage or higher of the signal voltage and decreases at a second specified voltage or higher of the signal voltage, thereby correcting a specified range of the signal voltage.

The above circuit configuration according to the present invention can output a current in a specified range since the current increases at the first specified voltage and also decreases at the second specified voltage. If this current is supplied to a resistor to be added to an original signal voltage, the tone correction in a specified range is obtained. Further, using a plurality of the tone correction circuits according to the present invention can provide several tone correction characteristics.

The above and other objects and features of the present invention will be more apparent from the following description taken in conjunction with the accompanying drawings.

BRIEF DESCRIPTION OF THE DRAWINGS

FIG. 8B is a graph showing the voltage characteristic at an output node 19 in the circuit configuration when FIG. 7 is combined with FIG. 5;

DESCRIPTION OF THE PREFERRED EMBODIMENTS

Now referring to the drawings, an explanation will be given of several embodiments of the present invention.

Figure 1:
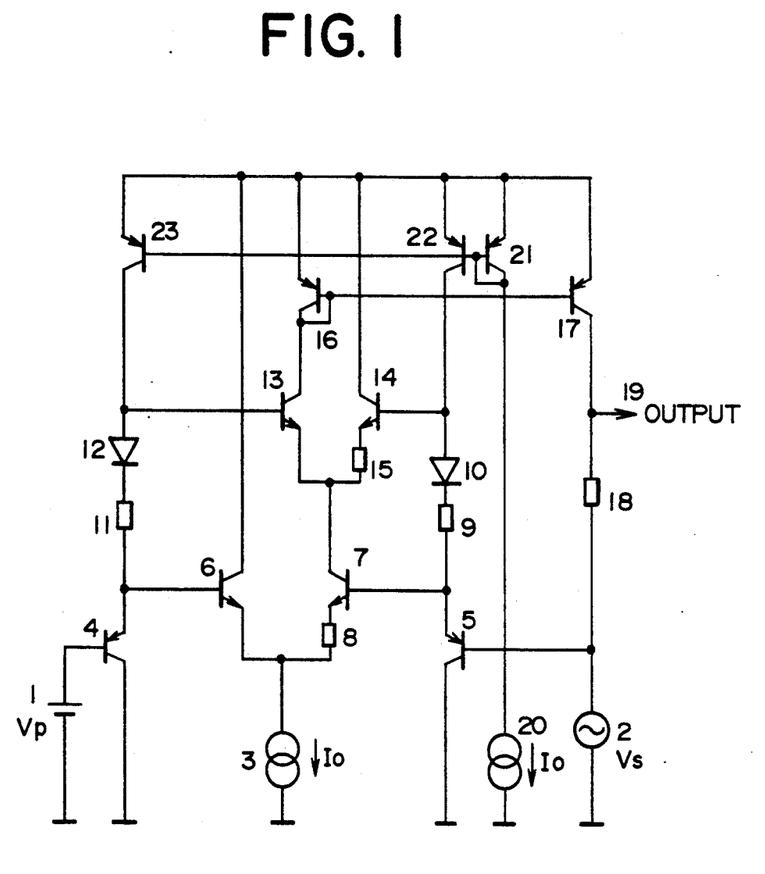
FIG. 1 is a circuit diagram of a circuit for correcting the tone of a luminance signal according to the first embodiment of the present invention.
Figure 2A:
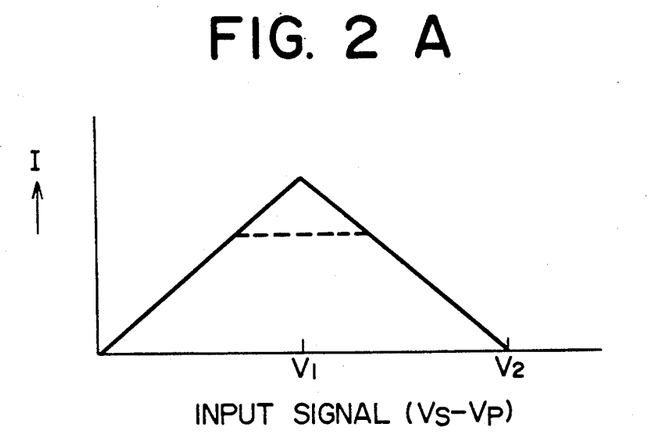
FIG. 2A is a graph showing the characteristic of the current flowing through a resistor 18 in FIG. 1.
Figure 2B:
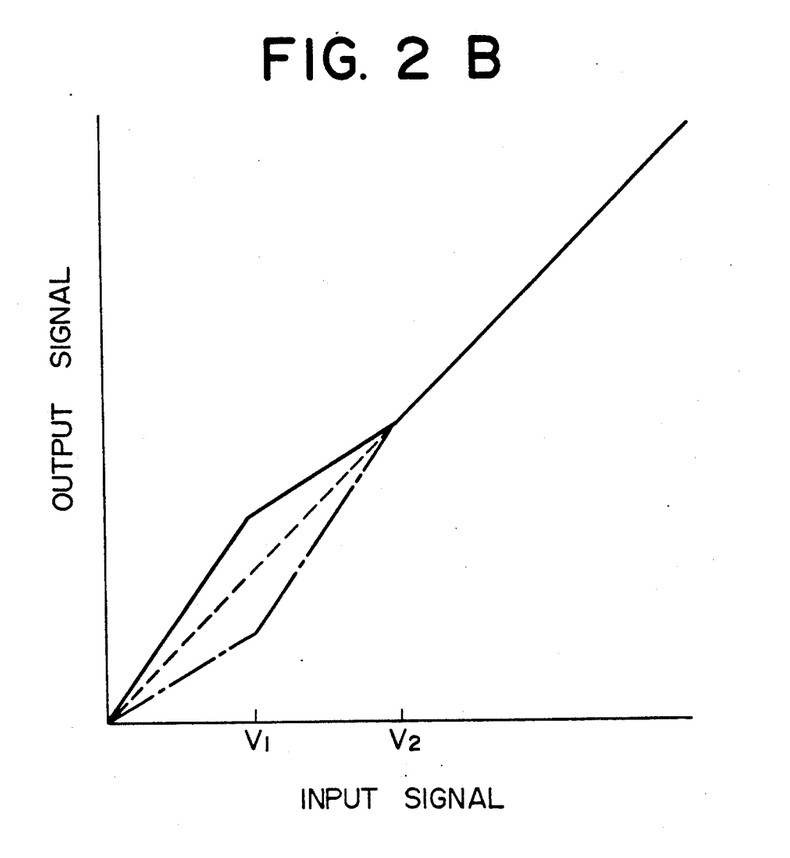
FIG. 2B is a graph showing the characteristic of the collector output voltage of a transistor 17 in FIG. 1.

FIG. 1 shows a circuit for correcting the tone of a luminance signal according to the first embodiment of the present invention. FIGS. 2A and 2B show a current output and a voltage output in FIG. 1. In FIG. 1, 1 denotes a constant voltage, 2 denotes a signal voltage; 3 and 20 denote a constant current source, respectively; 4, 5, 16, 17, 21, 22 and 23 denote PNP transistors; 6, 7, 13, 14 denote an NPN transistors, respectively; 8, 9, 11, 15 and 18 denote resistors, respectively; 10 and 12 denote a diodes, respectively; and 19 denotes an output.

An explanation will be given of the operation of the circuit configuration thus constructed.

When a signal voltage Vs exceeds a constant voltage Vp (pedestal voltage), the current of (Vs−Vp)/R8 flows into the transistor 7. This current is saturated when the input signal (Vs−Vp) becomes equal to V1 thereby providing a current 10. Considering also the emitter resistance of the transistor 7, the resistance values of resistors 9 and 15 (simply referred to as resistors) are made equal to that of the resistor 8, and the resistance value of the resistor 11 is made equal to the sum of the resistance values of the resistors 8 and 15, so that an operational amplifier composed of the NPN transistors 13 and 14 and the resistor 15 starts to operate when the input voltage reaches V1. Thus, the current flowing through the transistor 13 starts to decrease, and becomes zero when the input voltage reaches V2 as shown in FIG. 2A.

In accordance with this embodiment, if this current is passed through the resistor 18 via the current mirror composed of the PNP transistors 16 and 17, the output signal results in a corrected bending line as designated by the solid line in FIG. 2B. Although the case where a correction voltage is added to the input signal is shown here, subtraction of the correction voltage from the input signal provides another corrected bending line as indicated by the one-dot chain line in FIG. 2B. Further, if the resistor 11 is set to be smaller than the sum of the resistors 8 and 15, the differential amplifier (6, 7 and 8) starts to operate before the current is saturated. Inversely, if the former is set to be larger than the latter, the differential amplifier does not operate at once even if the current is saturated. In both cases, a pedestal-shaped corrected current, as shown by the broken line in FIG. 2A is generated, and thus the output signal in FIG. 2B will have a pedestal-shaped corrected waveform component (not shown).

Figure 3:
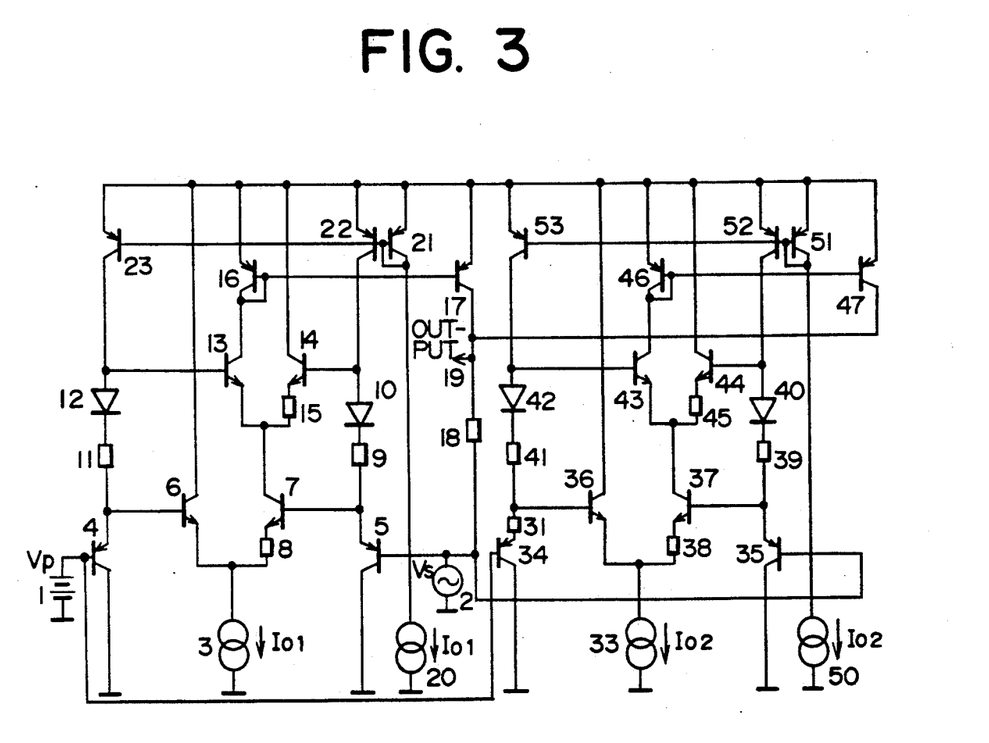
FIG. 3 is a circuit diagram of a circuit for correcting the tone of a luminance signal according to the second embodiment of the present invention.
Figure 4A:
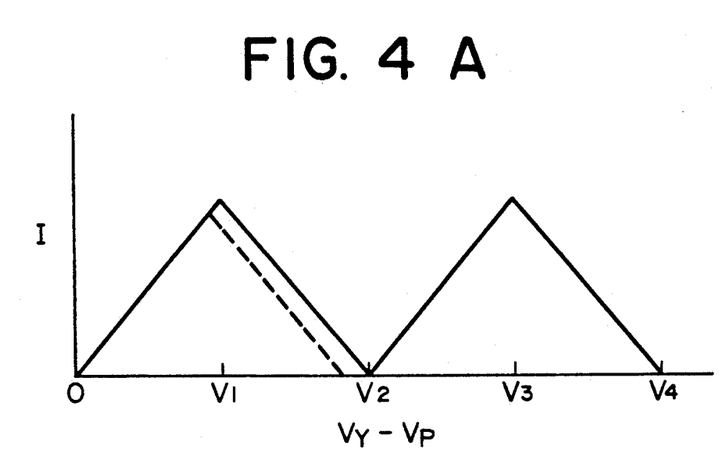
FIG. 4A is a graph showing the characteristic of the current flowing through a resistor 18 in FIG. 3.
Figure 4B:
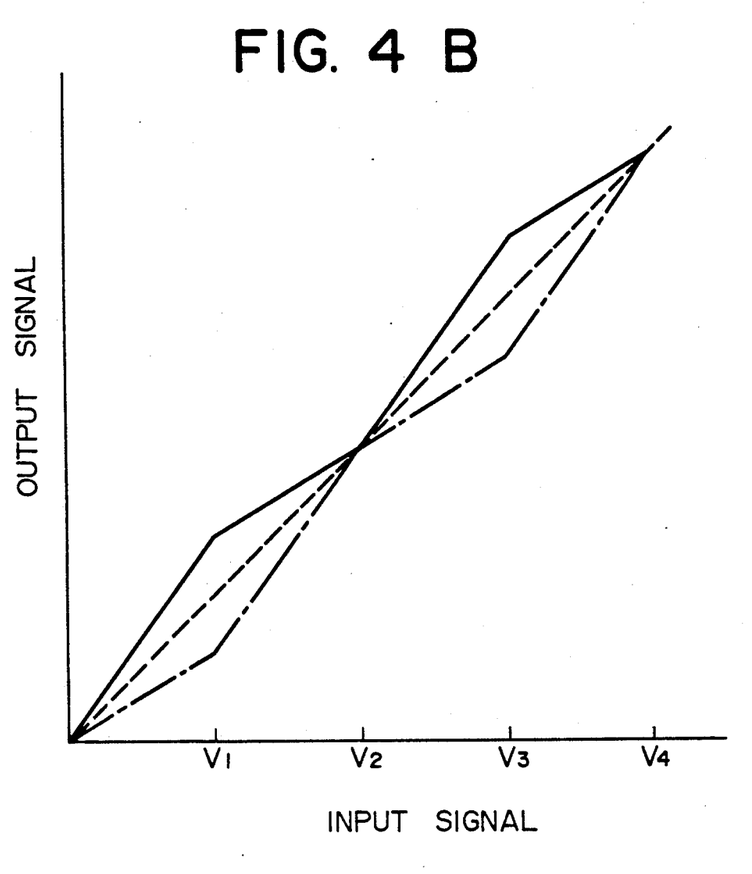
FIG. 4B is a graph showing the voltage at an output node 19 in FIG. 3.

FIG. 3 shows a circuit diagram of the tone correction circuit for a luminance signal according to the second embodiment of the present invention. FIGS. 4A and 4B show in the characteristics of the circuit show FIG. 3. In FIG. 3, components 33 to 47 and 50 to 53 constitute the same circuit configuration as constituted by the components 3 to 17 and 20 to 23 in FIG. 1 and also FIG. 3. It should be noted that a resistor 31 is arranged between the resistor 31 and the PNP transistor 34.

An explanation will be given of the operation of the circuit configuration of FIG. 3. The voltage across the resistor 31 provides a waveform when the triangle waveform shown in FIG. 2A is shifted rightwardly. Therefore, in accordance with this embodiment, two triangle waveforms can be obtained as shown in FIG. 4A. If the resistors 8 and 15 are set to be smaller than the resistor 9, as shown by the broken line in FIG. 4A, one waveform can be separated from the other waveform. If the resultant current is passed through the resistor 18, the output signal results in a waveform as shown in FIG. 4B. Although a correction voltage was added to the input signal in the circuit of FIG. 3, subtraction of the correction voltage from the input signal provides another corrected bending line as indicated by the one-dot chain line in FIG. 4B. It can be easily understood that the addition and subtraction can be done optionally. In this way, in accordance with this embodiment, an original output voltage is obtained at the midpoint V2, the γ (and reverse-γ) can be obtained in the ranges smaller and larger than the midpoint.

Figure 5:
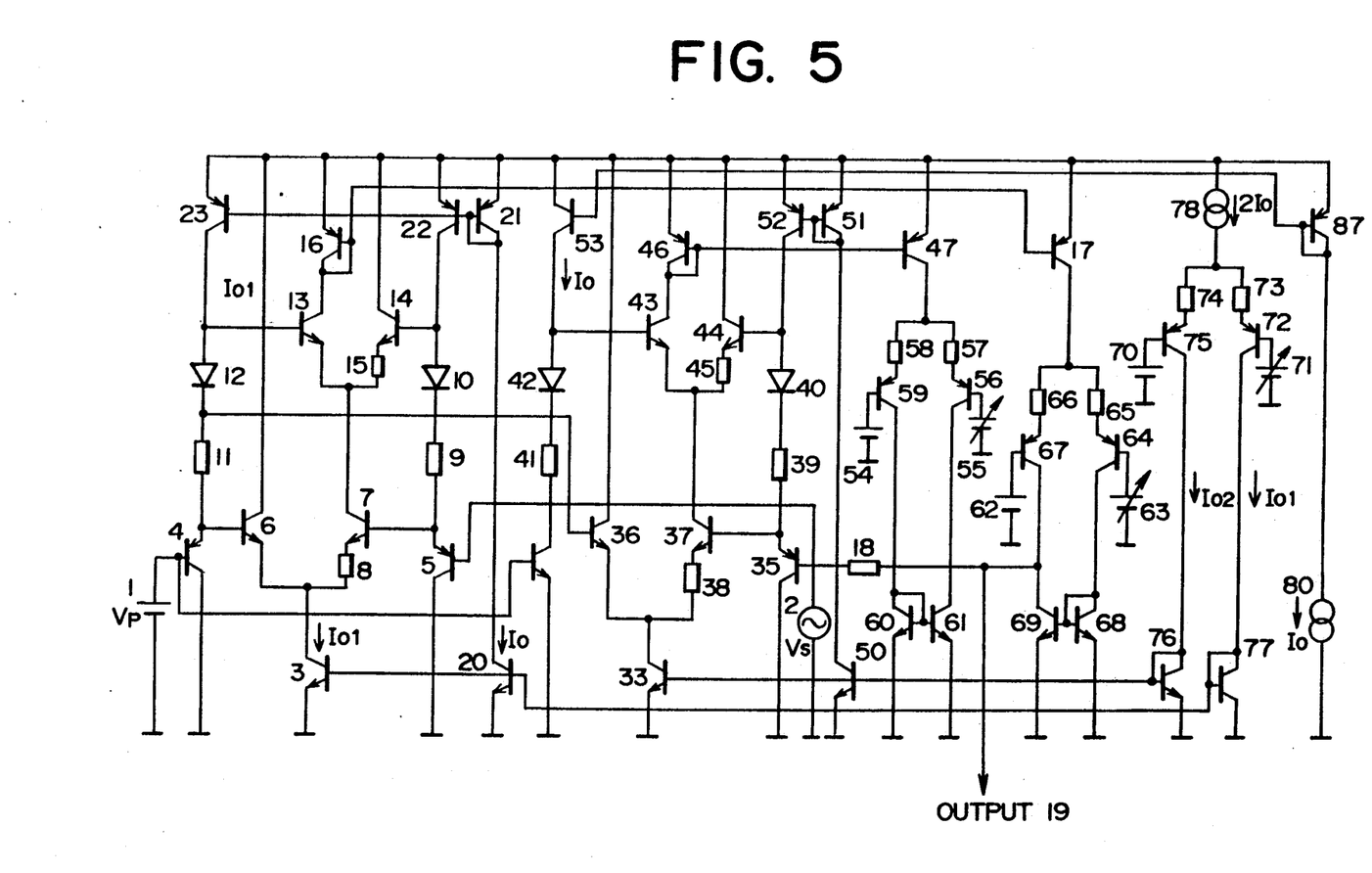
FIG. 5 is a circuit diagram of a circuit for correcting the tone of a luminance signal according to the third embodiment of the present invention.
Figure 6A:
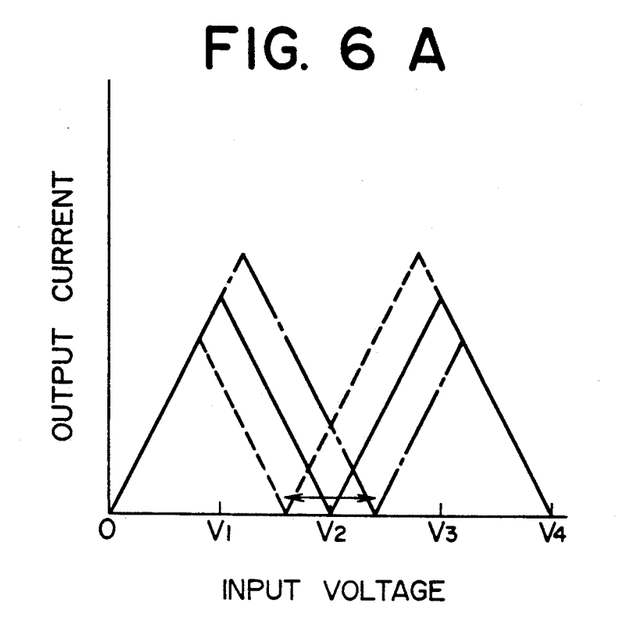
FIG. 6A is a graph showing the characteristic of the current flowing through a resistor 18 in FIG. 5.
Figure 6B:
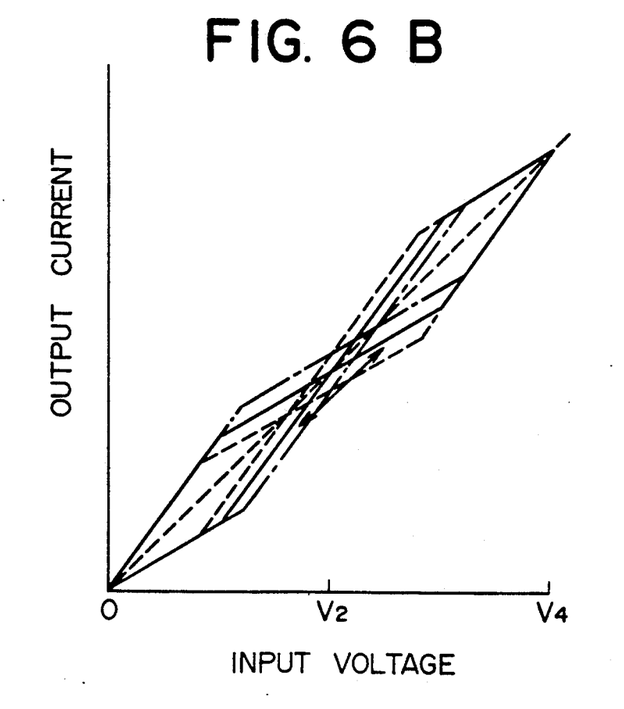
FIG. 6B is a graph showing the voltage at an output node 19 in FIG. 5.

FIG. 5 shows a circuit diagram of the tone correction circuit for a luminance signal according to the third embodiment of the present invention. FIGS. 6A and 6B show the characteristics of the circuit shown in FIG. 5. In FIG. 5, components 1 to 23 constitute a circuit for making the left triangle waveform shown in FIG. 6A; components 33 to 53 constitute a circuit for making the right triangle waveform shown in FIG. 6B; components 54 to 61 constitute a circuit for controlling the amount of addition or subtraction for the left triangle waveform; components 62 to 69 constitute a circuit for controlling the amount of addition or subtraction for the right triangle waveform; components 70 to 78 constitute a circuit for controlling current sources 101 and 102; and components 80 and 81 constitute a current source for determining a point V3. It should be noted that the resistances of the resistors 8, 9, 15, 38, 39 and 45 are equal to each other and those of the resistors 11 and 41 are also equal to each other.

An explanation will be given of the operation of the circuit configuration of FIG. 5. The current 210 supplied from the current source 78 is divided into 101 and 102 with the aid of the DC power source 70, the control voltage source 71 and a differential amplifier composed of the components 72, 73, 74 and 75. 101 flows through the differential amplifier (6, 7 and 8) and the resistors 9 and 11. Thus, the left triangle waveform in FIG. 6A is formed with V1 which is equal to (R8+re) x I01 and with V1 which is equal to (R8+R15+2re) x I01. I02 flows through the differential amplifier (36, 37 and 38) and the resistor 39. Thus, the right triangle waveform in FIG. 6A is formed with V3 which is equal to (R38+re) x I02+V1. If the value of the control voltage source 71 is varied, I01 and I02 also vary so that the midpoint V2 is shifted right or left, as shown in FIG. 6A. Then, the voltage changing amount across the resistor 11 is equal to the sum of the voltage changing amounts across the resistors 38 and 39, so that the point V4 remains fixed. If the voltage 55 is controlled for the DC voltage 54, the amount of increase or decrease in the range from 0 to V1 can be controlled, and the voltage 63 is controlled for the DC voltage 62, the amount of increase or decrease in the range from V1 to V2 can be controlled. Thus, the output characteristic as shown in FIG. 6B can be obtained.

Figure 7:
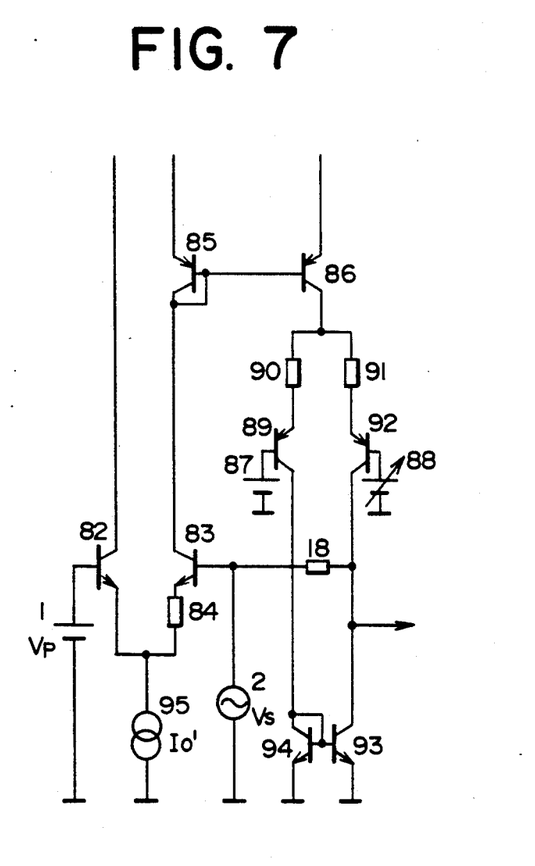
FIG. 7 is a circuit to be added to the circuit diagram according to the third embodiment of the present invention.

Further, if the circuit as shown in FIG. 7 is added to the circuit configuration shown in FIG. 5, the output characteristic with an optimum γ and reverse γ is obtained. In FIG. 7, 1 denotes a constant voltage source; 2 denotes luminance signal voltage; 95 denotes a constant current; 87 denotes a constant voltage source; 88 denotes a control voltage source; 82, 83, 93 and 94 denote NPN transistors, respectively; 85, 86, 89 and 92 denote PNP transistors, respectively; and 18, 84, 90 and 91 denote resistors, respectively.

Figure 8A:
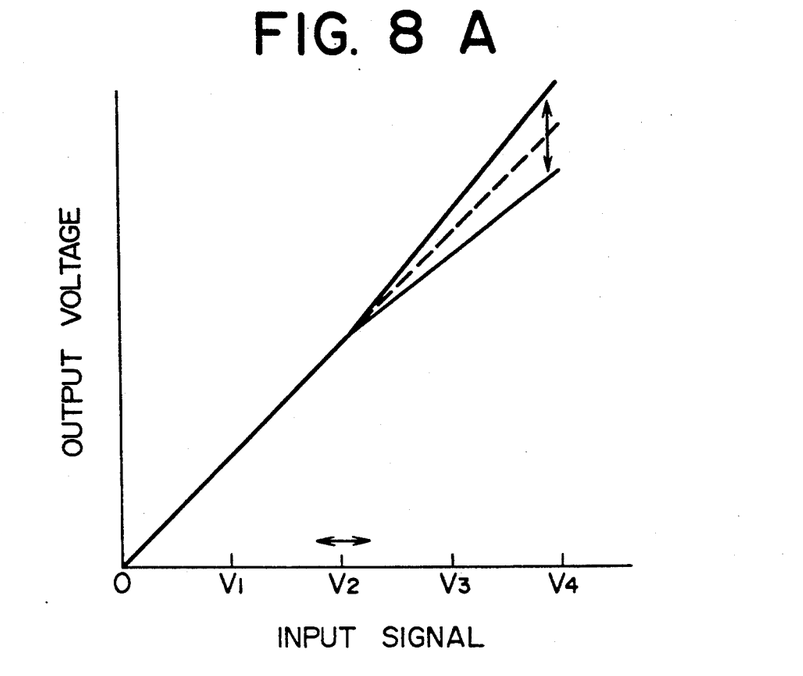
FIG. 8A is a graph showing the voltage characteristic at an output node 19 in FIG. 7.
Figure 8B:
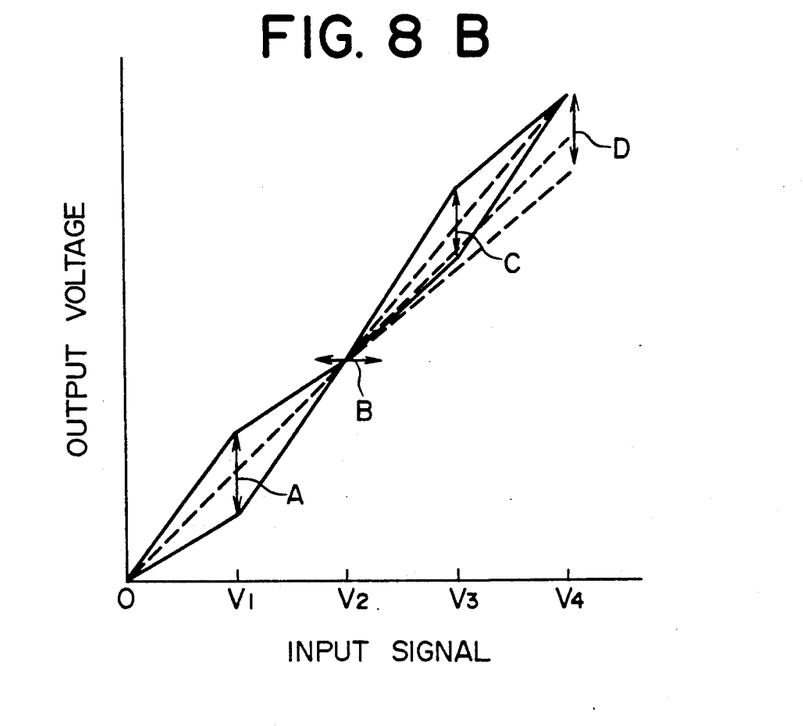

The operation of the circuit configuration will be explained below. When Vs exceeds Vp, the current which is equal to (Vs−Vp)/R84 flows through the NPN transistor 83; its amount is controlled by addition or performed by the current mirror (85, 86) and the addition/subtraction amount controlling circuit (87, 88, 89, 90, 91 and 92) and the controlled amount flows through the resistor 18. Thus, the characteristic, as shown in FIG. 8A, is obtained at the output node 19. As a result, the output characteristic as shown in FIG. 8B can be obtained In FIG. 8B, the items which can be controlled are the correction amount (A) at the point V1, the shifting amount (B) of the point V2, the correction amount (C) at the V2 point and the correction amount (D) at the maximum point V4.

In accordance with this embodiment, the original output voltage can be obtained at the minimum point and midpoint, this midpoint can be shifted, and the maximum point can be made larger or smaller than the original output. Further, the γ and reverse-γ characteristics can be obtained between the minimum points and between the midpoint and the maximum point.

The second embodiment also, using the circuit shown in FIG. 7, permits the gradient of the output voltage from the midpoint to the maximum point to be changed.

In accordance with the present invention, there is provided a circuit in which the current increases at a first specified voltage or higher and decreases at a second specified voltage or higher so that the current is outputted in a specified range, and also provided is a circuit which serve to increase the current at the second specified voltage or higher. Thus, without changing the output voltage at the midpoint, several γ and reverse-γ characteristics can be obtained so that an optimum output waveform can be obtained in accordance with a scene. Particularly, in realizing fuzzy control, which has drawn attention in recent years, the actual effect of the present invention is very great.

I claim:

1. A tone correction circuit comprising:
   a constant voltage source;
   a first constant current source;
   a first differential amplifier including a first transistor having a collector connected to said constant voltage source and an emitter connected to said constant current source, and a second transistor having an emitter connected to the emitter of said first transistor through a first resistance; and
   a second differential amplifier including a third transistor having an emitter connected to a collector of said second transistor and a fourth transistor having an emitter connected to the emitter of said third transistor through a second resistance and having a collector connected to said constant voltage source,
   wherein a constant voltage is applied to a base of said first transistor, a first signal voltage is applied to a base of said second transistor, a voltage, higher than said constant voltage by a first predetermined voltage, is applied to a base of said third transistor, and a second signal voltage, higher than said first signal voltage by a second predetermined voltage, is applied to a base of said fourth transistor so that a current is output from a collector of said third transistor.

2. A tone correction circuit according to claim 1, wherein a value obtained by multiplying the sum of the first resistance and the second resistance by the current supplied from said first current source is equal to a value obtained by subtracting said second predetermined voltage from said first predetermined voltage.

3. A tone correction circuit according to claim 2, wherein said first resistance is equal to said second resistance, and the rising gradient of the collector current from said third transistor is equal to the falling gradient of the collector current from said third transistor.

4. A tone correction circuit according to claim 3, wherein the value obtained by subtracting said second predetermined voltage from said first predetermined voltage is made by the current to be passed through a resistor, and said current is made variable so that an operation voltage range is made variable.

5. A tone correction circuit comprising a plurality of tone correction circuits defined in claim 3, wherein said plurality of tone correction circuits generate currents in different voltage ranges so as to have the ranges where a current flows and does not flow.

6. A tone correction circuit comprising a plurality of tone correction circuits defined in claim 3, wherein said plurality of tone correction circuits are operated in such a way that the corresponding voltage ranges are made proportionally variable.

7. A tone correction circuit comprising a plurality of tone correction circuits defined in claim 3, wherein said plurality of tone correction circuits are operated in such a way that the corresponding operating voltages ranges are located in the range from the minimum value of an input signal to the maximum value of said input signal.

8. A tone correction circuit comprising a plurality of tone correction circuits defined in claim 4, wherein said plurality of tone correction circuits are operated in different and overlapping voltage ranges.

9. A tone correction circuit according to claim 2, wherein the amount of said current is controlled and converted into a voltage which is added to or subtracted from said first signal voltage.

10. A tone correction circuit comprising a plurality of tone correction circuits defined in claim 9, wherein said plurality of tone correction circuits generate currents in different voltage ranges so as to have the ranges where a current flows and does not flow.

11. A tone correction circuit comprising a plurality of tone correction circuits defined in claim 9, wherein aid plurality of tone correction circuits are operated in such a way that the corresponding voltage ranges are made proportionally variable.

12. A tone correction circuit comprising a plurality of tone correction circuits defined in claim 9, wherein said plurality of tone correction circuits are operated in such a way that the corresponding operating voltage ranges are located in the range from the minimum value of an input signal to the maximum value of said input signal.

13. A tone correction circuit comprising a plurality of tone correction circuits defined in claim 9, wherein said plurality of tone correction circuits are operated in different and overlapping voltage ranges.

14. A tone correction circuit according to claim 2, wherein the value obtained by subtracting said second predetermined voltage from said first predetermined voltage is made by the current to be passed through a resistor, and said current is made variable so that an operation voltage range is made variable.

15. A tone correction circuit comprising a plurality of tone correction circuits defined in claim 2, wherein said plurality of tone correction circuits generate current in different voltage ranges so as to have the ranges where a current flows and does not flow.

16. A tone correction circuit comprising a plurality of tone correction circuits defined in claim 2, wherein said plurality of tone correction circuits are operated in such a way that the corresponding voltage ranges are made proportionally variable.

17. A tone correction circuit comprising a plurality of tone correction circuits defined in claim 2, wherein said plurality of tone correction circuits are operated in such a way that the corresponding operating voltage ranges are located in the range from the minimum value of an input signal to the maximum value of said input signal.

18. A tone correction circuit comprising a plurality of tone correction circuits defined in claim 2, wherein said plurality of tone correction circuits are operated in different and overlapping voltage ranges.

19. A tone correction circuit according to claim 1, wherein said first resistance is equal to said second resistance, and the rising gradient of the collector current from said third transistor is equal to the falling gradient of the collector current from said third transistor.

20. A tone correction circuit according to claim 19, wherein the amount of said current is controlled and converted into a voltage which is added to or subtracted from said first signal voltage.

21. A tone correction circuit according to claim 19, wherein the value obtained by subtracting said second predetermined voltage from said first predetermined voltage is made by the current to be passed through a resistor, and said current is made variable so that an operation voltage range is made variable.

22. A tone correction circuit comprising a plurality of tone correction circuits defined in claim 19, wherein said plurality of tone correction circuits generate currents in different voltage ranges so as to have the ranges where a current flows and does not flow.

23. A tone correction circuit comprising a plurality of tone correction circuits defined in claim 19, wherein said plurality of tone correction circuits are operated in such a way that the corresponding voltage ranges are made proportionally variable.

24. A tone correction circuit comprising a plurality of tone correction circuits defined in claim 19, wherein said plurality of tone correction circuits are operated in such a way that the corresponding operating voltage ranges are located in the range from the minimum value of an input signal to the maximum value of said input signal.

25. A tone correction circuit comprising a plurality of tone correction circuits defined in claim 19, wherein said plurality of tone correction circuits are operated in different and overlapping voltage ranges.

26. A tone correction circuit according to claim 1, wherein the amount of said current is controlled and converted into a voltage which is added to or subtracted from said first signal voltage.

27. A tone correction circuit comprising a plurality of tone correction circuits defined in claim 26, wherein said plurality of tone correction circuits generate currents in different voltage ranges so as to have the ranges where a current flows and does not flow.

28. A tone correction circuit comprising a plurality of tone correction circuits defined in claim 26, wherein said plurality of tone correction circuits are operated in such a way that the corresponding voltage ranges are made proportionally variable.

29. A tone correction circuit comprising a plurality of tone correction circuits defined in claim 26, wherein said plurality of tone correction circuits are operated in such a way that the corresponding operating voltage ranges are located in the range from the minimum value of an input signal to the maximum value of said input signal.

30. A tone correction circuit comprising a plurality of tone correction circuits defined in claim 26, wherein said plurality of tone correction circuits are operated in different and overlapping voltage ranges.

31. A tone correction circuit according to claim 1, wherein a value obtained by subtracting said second predetermined voltage from said first predetermined voltage is made by the current to be passed through a resistor, and said current is made variable so that an operation voltage range is made variable.

32. A tone correction circuit according to claim 1, wherein a value obtained by multiplying the sum of the first resistance and the second resistance by the current supplied from said current source is different from a value obtained by subtracting said second predetermined voltage from said first predetermined voltage, and the collector current outputted from said third transistor has a pedestal-shaped waveform.

33. A tone correction circuit comprising a plurality of tone correction circuits defined in claim 1, wherein said plurality of tone correction circuits generate currents in different voltage ranges so as to have the ranges where a current flows and does not low.

34. A tone correction circuit comprising a plurality of tone correction circuits defined in claim 1, wherein said plurality of tone correction circuits are operated in such a way that the corresponding voltage ranges are made proportionally variable.

35. A tone correction circuit comprising a plurality of tone correction circuits defined in claim 1, wherein said plurality of tone correction circuits are operated in such a way that the corresponding operating voltage ranges are located in the range from the minimum value of an input signal to the maximum value of said input signal.

36. A tone correction circuit comprising a plurality of tone correction circuits defined in claim 1, wherein said plurality of tone correction circuits are operated in different and overlapping voltages ranges.

37. A tone correction circuit comprising:
   a constant voltage source;
   a first constant current source;
   a first differential amplifier including a first transistor having a collector connected to said constant voltage source and an emitter connected to said first constant current source, and a second transistor having an emitter connected to the emitter of said first transistor through a first resistance;
   a second constant current source;
   a second differential amplifier including a third transistor having an emitter connected to a collector of said second transistor and a fourth transistor having an emitter connected to the emitter of said third transistor through a second resistance and a collector connected to said constant voltage source;
   a third differential amplifier including a fifth transistor having a collector connected to said constant voltage source and an emitter connected to said second constant current source, and a sixth transistor having an emitter connected to the emitter of said fifth transistor through a third resistance; and
   a fourth differential amplifier including a seventh transistor having an emitter connected to a collector of said sixth transistor and an eighth transistor having an emitter connected to the emitter of said seventh transistor through a fourth resistance and a collector connected to said constant voltage source,
   wherein a constant voltage is applied to a base of said first and fifth transistors, a first signal voltage is applied to a base of each of said second and sixth transistors, a second signal voltage, higher than said first signal voltage by a first predetermined voltage, is applied to a base of said fourth transistor, and a voltage, higher than said constant voltage by a sum of (i) said first predetermined voltage and (ii) a voltage, obtained by multiplying a sum of said first resistance and said second resistance by a current supplied from said first current source, is applied to a base of said third transistor, whereby said first current source is varied with a sum of the currents from said first and second current source being maintained constant so that currents are output from the collectors of said third and seventh transistors.

38. A tone correction circuit according to claim 37, further comprising:
a third constant current source; and
a fifth differential amplifier including a ninth transistor having an emitter connected to said third constant current source and a tenth transistor having an emitter connected to the emitter of said fifth transistor through a fifth resistance,
wherein a voltage is applied to the base of said ninth transistor, which is higher than said constant voltage by a value equal to the sum of (i) said first predetermined voltage and (ii) the voltage obtained by multiplying the sum of the first and second resistances by the current from said current source, so that the collector currents from said third, seventh and tenth transistors are outputted.

39. A tone correction circuit according to claim 38, wherein the amounts of said currents from said third, seventh and tenth transistors are controlled and converted into voltages which are added to or subtracted from said first signal voltages.

40. A tone correction circuit according to claim 39, wherein said first and second currents are controlled by the APL of the signal voltage, the collector current from said third transistor is controlled by the number of times of the signals of 0 to APL/2 and APL/2 to APL, and the collector current from said seventh transistor is controlled by the number of times of the signals of APL to (the maximum value−APL)/2 and (the maximum value−APL)/2 to the maximum value.

41. A tone correction circuit according to claim 38, wherein said first and second currents are controlled by the APL of the signal voltage.

42. A tone correction circuit according to claim 38, wherein said first and second currents are controlled by the APL of the signal voltage, the collector current from said third transistor is controlled by the number of times of the signals of 0 to APL/2 and APL/2 to APL, and the collector current from said seventh transistor is controlled by the number of times of the signals of APL to (the maximum value−APL)/2 and (the maximum value−APL)/2 to the maximum value.

43. A tone correction circuit according to claim 37, wherein the amounts of said currents from said third, seventh and tenth transistors are controlled and converted into voltages which are added to or subtracted from said first signal voltage.

44. A tone correction circuit according to claim 43, wherein said first and second currents are controlled by the APL of the signal voltage.

45. A tone correction circuit according to claim 43, wherein said first and second currents are controlled by the APL of the signal voltage, the collector current from said third transistor is controlled by the number of times of the signals of 0 to APL/2 and APL/2 to APL, and the collector current from said seventh transistor is controlled by the number of times of the signals of APL to (the maximum value−APL)/2 (the maximum value−APL)/2 to the maximum value.

46. A tone correction circuit according to claim 37, wherein said first and second currents are controlled by the APL of the signal voltage.

47. A tone correction circuit according to claim 37, wherein said first and second currents are controlled by the APL of the signal voltage, the collector current from said third transistor is controlled by the number of times of the signals of 0 to APL/2 and APL/2 to APL, and the collector current from said seventh transistor is controlled by the number of times of the signals of APL to (the maximum value−APL)/2 (the maximum value−APL)/2 to the maximum value.

* * * * *